US012770054B2

(12) United States Patent
Jiang et al.

(10) Patent No.: US 12,770,054 B2
(45) Date of Patent: Oct. 20, 2026

(54) SYSTEM AND METHODS FOR BID OPTIMIZATION IN REAL-TIME BIDDING

(71) Applicant: Samsung Electronics Co., Ltd., Suwon-si (KR)

(72) Inventors: Zhimeng Jiang, College Station, TX (US); Kaixiong Zhou, Houston, TX (US); Mi Zhang, Santa Clara, CA (US); Rui Chen, Sunnyvale, CA (US); Xia Hu, Bellaire, TX (US); Soo-Hyun Choi, Kyonggi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1249 days.

(21) Appl. No.: 17/676,687

(22) Filed: Feb. 21, 2022

(65) Prior Publication Data

US 2023/0089895 A1 Mar. 23, 2023

Related U.S. Application Data

(60) Provisional application No. 63/245,724, filed on Sep. 17, 2021.

(51) Int. Cl.

| | |
|---|---|
| ***G06N 20/00*** | (2019.01) |
| ***G06Q 30/0283*** | (2023.01) |
| ***G06Q 30/08*** | (2012.01) |

(52) U.S. Cl.
CPC ......... *G06N 20/00* (2019.01); *G06Q 30/0283* (2013.01); *G06Q 30/08* (2013.01)

(58) Field of Classification Search
CPC ..... G06N 20/00; G06Q 30/0283; G06Q 30/08
See application file for complete search history.

(56) References Cited

U.S. PATENT DOCUMENTS

2010/0082433 A1 4/2010 Zhou et al.
2012/0041816 A1 2/2012 Buchalter
(Continued)

FOREIGN PATENT DOCUMENTS

WO 2020104806 A1 5/2020

OTHER PUBLICATIONS

Zhang, Haifeng, et al. "Managing risk of bidding in display advertising." Proceedings of the Tenth ACM International Conference on Web Search and Data Mining. 2017. (Year: 2017).*
(Continued)

*Primary Examiner* — Miranda M Huang

(57) ABSTRACT

A method of operating a demand side platform (DSP) includes determining a current state of the DSP, wherein the current state of the DSP is based on a remaining bid budget and remaining number of opportunities, receiving, at the DSP, a bid request for one or more advertisement impressions, and determining an uncertainty of a predicted user response probability. The method further includes determining a risk tendency value based on the current state of the DSP, determining an adjusted value of the one or more advertisement impressions based on the uncertainty and risk tendency, determining a bid price for each of the one or more advertisement impressions based on the adjusted value of the one or more advertisement impressions, transmitting the bid price to an exchange platform to participate in an auction, receiving an auction result and updating the current state of the DSP based on the auction result.

20 Claims, 8 Drawing Sheets

(56) References Cited

U.S. PATENT DOCUMENTS

| | | | |
|---|---|---|---|
| 2014/0034086 A1 | 2/2014 | Chung et al. |
| 2015/0348139 A1 | 12/2015 | Silverman et al. |
| 2016/0092933 A1 | 3/2016 | Xu et al. |
| 2016/0180373 A1 | 6/2016 | Xu et al. |
| 2017/0024777 A1 | 1/2017 | Rajwat et al. |
| 2017/0286870 A1 | 10/2017 | Hoover et al. |
| 2018/0158095 A1 | 6/2018 | Karlsson et al. |
| 2019/0114677 A1 | 4/2019 | Xie et al. |
| 2019/0130456 A1 | 5/2019 | De La Breteche et al. |
| 2021/0081800 A1 | 3/2021 | Zhang et al. |
| 2021/0082001 A1 | 3/2021 | Yolken |
| 2021/0201202 A1 | 7/2021 | Simhon |

OTHER PUBLICATIONS

Wu, Di, et al. "Budget constrained bidding by model-free reinforcement learning in display advertising." Proceedings of the 27th ACM International Conference on Information and Knowledge Management. 2018. (Year: 2018).*

Grislain, Nicolas, Nicolas Perrin, and Antoine Thabault. "Recurrent neural networks for stochastic control in real-time bidding." Proceedings of the 25th ACM SIGKDD International Conference on Knowledge Discovery & Data Mining. 2019. (Year: 2019).*

Fortunato, Meire, et al. "Noisy networks for exploration." arXiv preprint arXiv:1706.10295v3 (2019). (Year: 2019).*

Supplementary European Search Report dated Feb. 19, 2024 in connection with European Patent Application No. 22870076.1, 10 pages.

Zhang et al., "Managing Risk of Bidding in Display Advertising," WSDM 17: Proceedings of the Tenth ACM International Conference on Web Search and Data Mining, Jan. 2017, 10 pages.

Aoullay, "How to use Noise to your advantage," Towards Data Science, Jun. 2018, 7 pages.

Zha et al., "Experience Replay Optimization," Machine Learning (cs.LG), Jun. 2019, 7 pages.

European Search Report dated Dec. 22, 2025 in connection with European Patent Application No. 22870076.1, 9 pages.

International Search Report and Written Opinion of the International Searching Authority regarding International Patent Application No. PCT/KR2022/005149 dated Jul. 12, 2022, 6 pages.

* cited by examiner

CONTINUED IN FIG. 7B

SYSTEM AND METHODS FOR BID OPTIMIZATION IN REAL-TIME BIDDING

CROSS-REFERENCE TO RELATED APPLICATION AND CLAIM OF PRIORITY

This application claims priority under 35 U.S.C. § 119(e) to U.S. Provisional Patent Application No. 63/245,724 filed on Sep. 17, 2021. The above-identified provisional patent application is hereby incorporated by reference in its entirety.

TECHNICAL FIELD

The present disclosure relates generally to systems and methods for automatically reserving resources through networked systems in real-time, in particular, systems and methods for bid optimization in real-time bidding.

BACKGROUND

Improvements in network connectivity, and in particular, reliable provision of network services with sub-second or even shorter latencies have catalyzed a shift how contentious resources (for example, cloud computing resources and ad impressions for online advertisements) are obtained. The above-described improvements in network throughput have catalyzed a pivot away from consumers of contentious resources reserving resources in advance towards real-time processes for allocation of contentious resources, such as through spot auctions between automated bidding platforms wherein automated bidding platforms programmatically determine bid values and submit bids for a contentious resource over a network.

At a basic level, automatic bidding platforms are apparatus for winning automated auctions for contentious resources. Thus, the extent to which an automated bidding platform can generate bids which efficiently win auctions is a key metric of the performance of such platforms. As used in this disclosure, the expression "efficiently winning" an auction encompasses both a financial dimension (i.e., generating and submitting a bid value that exceeds the second highest bid by the smallest permissible account), and a computational dimension, as expressed in the number of computational cycles and network traffic required to generate and submit a winning bid.

Accordingly, improving the efficiency of automatic bidding platforms presents a source of technical challenges and opportunities for improvement in the art.

SUMMARY

This disclosure provides methods and apparatus for methods and apparatus for service-level agreement monitoring and violation mitigation in wireless communication networks.

In one embodiment, a method of operating a demand side platform (DSP) includes determining a current state of the DSP, wherein the current state of the DSP is based on a remaining bid budget and remaining number of opportunities, receiving, at the DSP, a bid request for one or more advertisement impressions, and determining an uncertainty of a predicted user response probability. The method further includes determining a risk tendency value based on the current state of the DSP, determining an adjusted value of the one or more advertisement impressions based on the uncertainty and risk tendency, determining a bid price for each of the one or more advertisement impressions based on the adjusted value of the one or more advertisement impressions, transmitting the bid price to an exchange platform to participate in an auction, receiving an auction result and updating the current state of the DSP based on the auction result.

In another embodiment, a demand side platform (DSP) includes a processor, a network interface and a memory. The memory contains instructions, which when executed by the processor, cause the DSP to determine a current state of the DSP, wherein the current state of the DSP is based on a remaining bid budget and remaining number of opportunities, receive, via the network interface, a bid request for one or more advertisement impressions, determine an uncertainty of a predicted user response probability, determine a risk tendency value based on the current state of the DSP, determine an adjusted value of the one or more advertisement impressions based on the uncertainty and risk tendency, determine a bid price for each of the one or more advertisement impressions based on the adjusted value of the one or more advertisement impressions, transmit, via the network interface, the bid price to an exchange platform to participate in an auction, receive, via the network interface, an auction result, and update the current state of the DSP based on the auction result.

In another embodiment, a non-transitory, computer-readable medium contains instructions, which when executed by a processor, cause a demand side platform (DSP) to determine a current state of the DSP, wherein the current state of the DSP is based on a remaining bid budget and remaining number of opportunities, receive, via a network interface, a bid request for one or more advertisement impressions, determine an uncertainty of a predicted user response probability, determine a risk tendency value based on the current state of the DSP, determine an adjusted value of the one or more advertisement impressions based on the uncertainty and risk tendency, determine a bid price for each of the one or more advertisement impressions based on the adjusted value of the one or more advertisement impressions, transmit, via the network interface, the bid price to an exchange platform to participate in an auction, receive, via the network interface, an auction result, and update the current state of the DSP based on the auction result.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
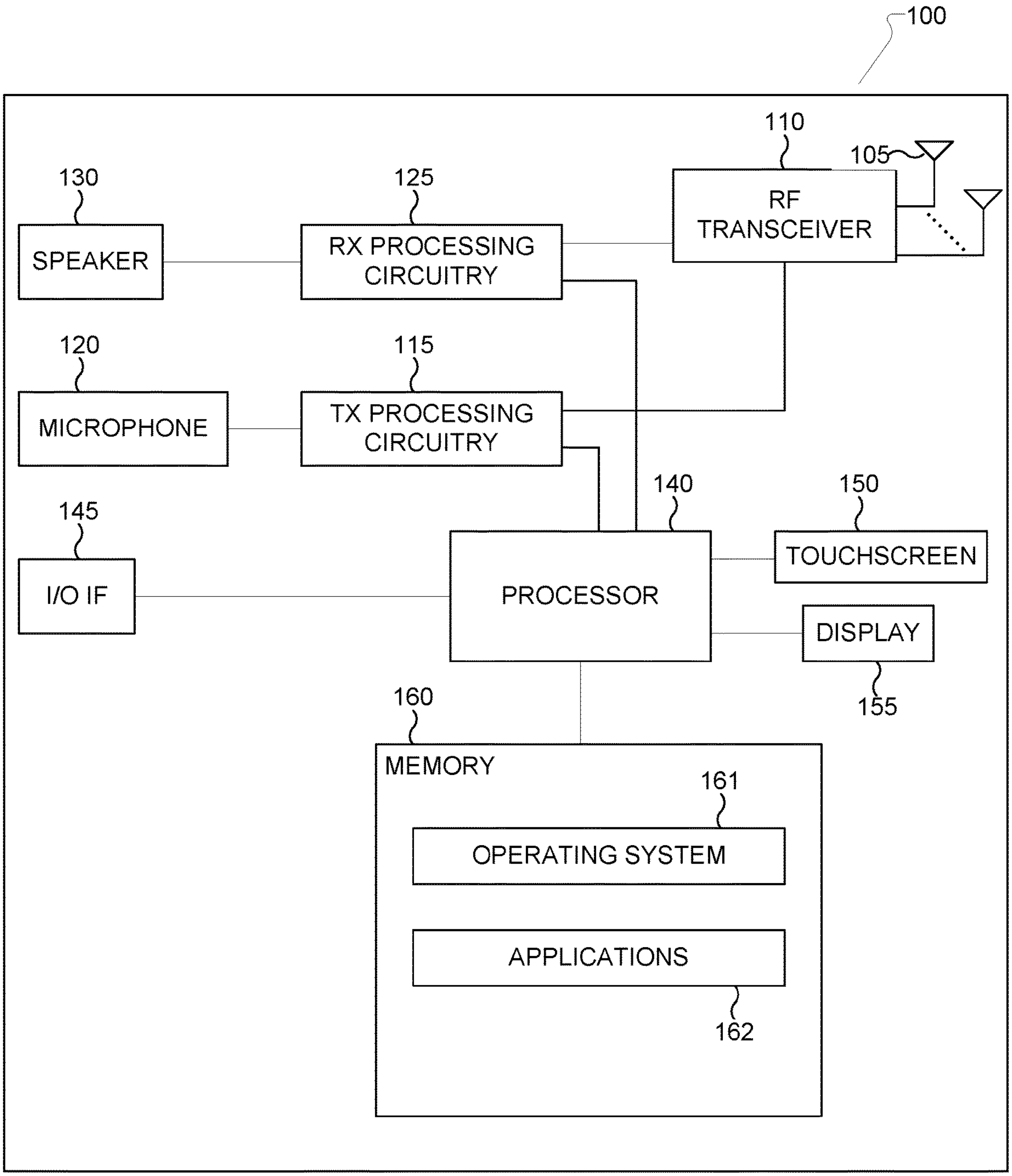
FIG. 1 illustrates an example of an electronic device according to this disclosure.

FIG. 1 illustrates an example of an electronic device 100 according to this disclosure. The embodiment of the electronic device 100 is for illustration. However, electronic devices come in a wide variety of configurations, and FIG. 1 does not limit the scope of this disclosure to any particular implementation of an electronic device.

As shown in FIG. 1, the electronic device 100 includes an antenna 105, a radio frequency (RF) transceiver 110, transmit (TX) processing circuitry 115, a microphone 120, and receive (RX) processing circuitry 125. The electronic device 100 also includes a speaker 130, a main processor 140, an input/output (I/O) interface (IF) 145, a touchscreen 150, a display 3155, and a memory 160. The memory 160 includes a basic operating system (OS) program 161 and one or more applications 162.

The RF transceiver 110 receives from the antenna 105, an incoming RF signal transmitted by base station of a network. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105. According to certain embodiments, TX processing circuitry and RX processing circuitry encode and decode data and signaling for wireless in resource blocks ("RBs" or physical resource blocks "PRBs") which are transmitted and received by, inter alia, the base stations of a wireless network. Put differently, TX processing circuitry 115 and RX processing circuitry 125 generate and receive RBs which contribute to a measured load at a base station. Additionally, RX processing circuitry 125 may be configured to measure values of one or more parameters of signals received at electronic device 100.

The main processor 140 can include one or more processors or other processing devices and execute the basic OS program 161 stored in the memory 160 in order to control the overall operation of the electronic device 100. For example, the main processor 140 could control the reception of forward channel signals and the transmission of reverse channel signals by the RF transceiver 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to signals received from base stations or an operator. The main processor 140 is also coupled to the I/O interface 145, which provides the electronic device 100 with the ability to connect to other devices such as laptop computers and handheld computers. The I/O interface 145 is the communication path between these accessories and the main processor 140.

The main processor 140 is also coupled to the touchscreen 150 and the display unit 155. The operator of the electronic device 100 can use the touchscreen 150 to enter data into the electronic device 100. The display 155 may be a liquid crystal display or other display capable of rendering text and/or at least limited graphics, such as from web sites.

The memory 160 is coupled to the main processor 140. Part of the memory 160 could include a random-access memory (RAM), and another part of the memory 160 could include a Flash memory or other read-only memory (ROM).

Although FIG. 1 illustrates one example of electronic device 100, various changes may be made to FIG. 1. For example, various components in FIG. 1 could be combined, further subdivided, or omitted and additional components could be added according to particular needs. As a particular example, the main processor 140 could be divided into multiple processors, such as one or more central processing units (CPUs) and one or more graphics processing units (GPUs). Also, while FIG. 1 illustrates the electronic device 100 configured as a mobile telephone or smartphone, UEs could be configured to operate as other types of mobile or stationary devices.

Figure 2:
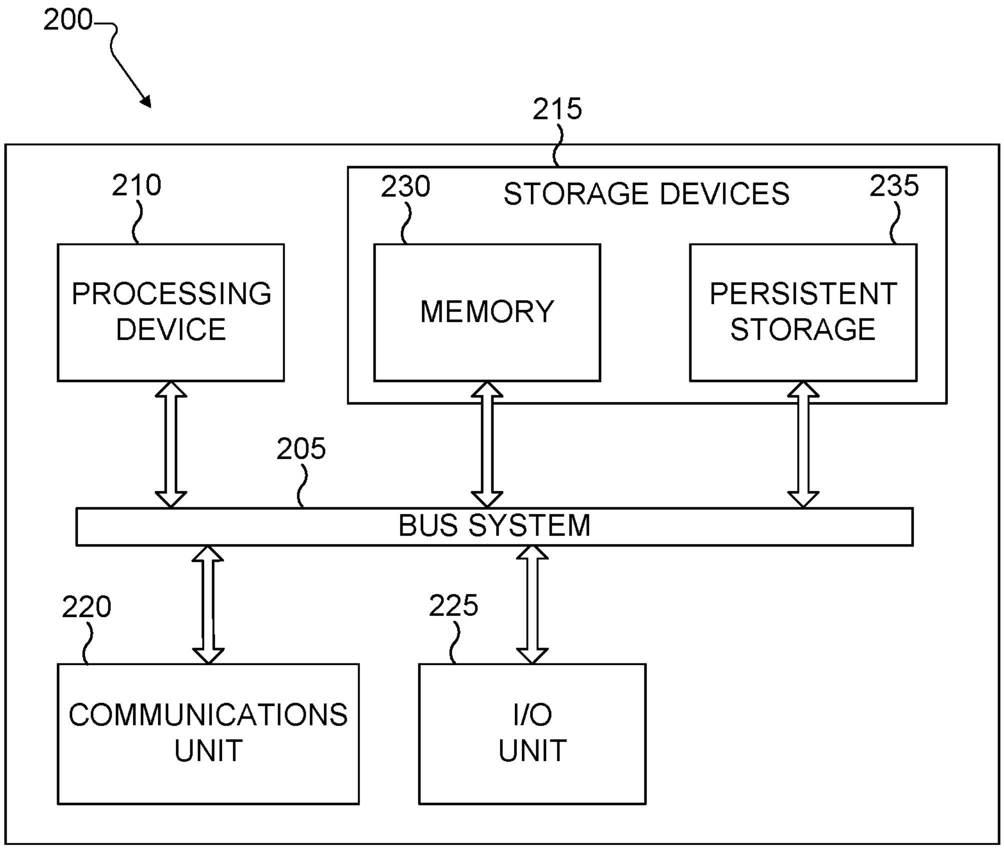
FIG. 2 illustrates an example server according to some embodiments of this disclosure.

FIG. 2 illustrates an example of a server 200 according to certain embodiments of this disclosure. Depending on embodiments, server 200 can be implemented as part of a base station. The embodiment of server 200 shown in FIG. 2 is for illustration only and other embodiments could be used without departing from the scope of the present disclosure.

In the example shown in FIG. 2, server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over a network. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device. While server 200 has been described with reference to a standalone device, embodiments according to this disclosure are not so limited, and server 200 could also be embodied in whole, or in part, on a cloud or virtualized computing platform. Additionally, in some embodiments, server 200 may be embodied across multiple computing platforms.

Figure 3:
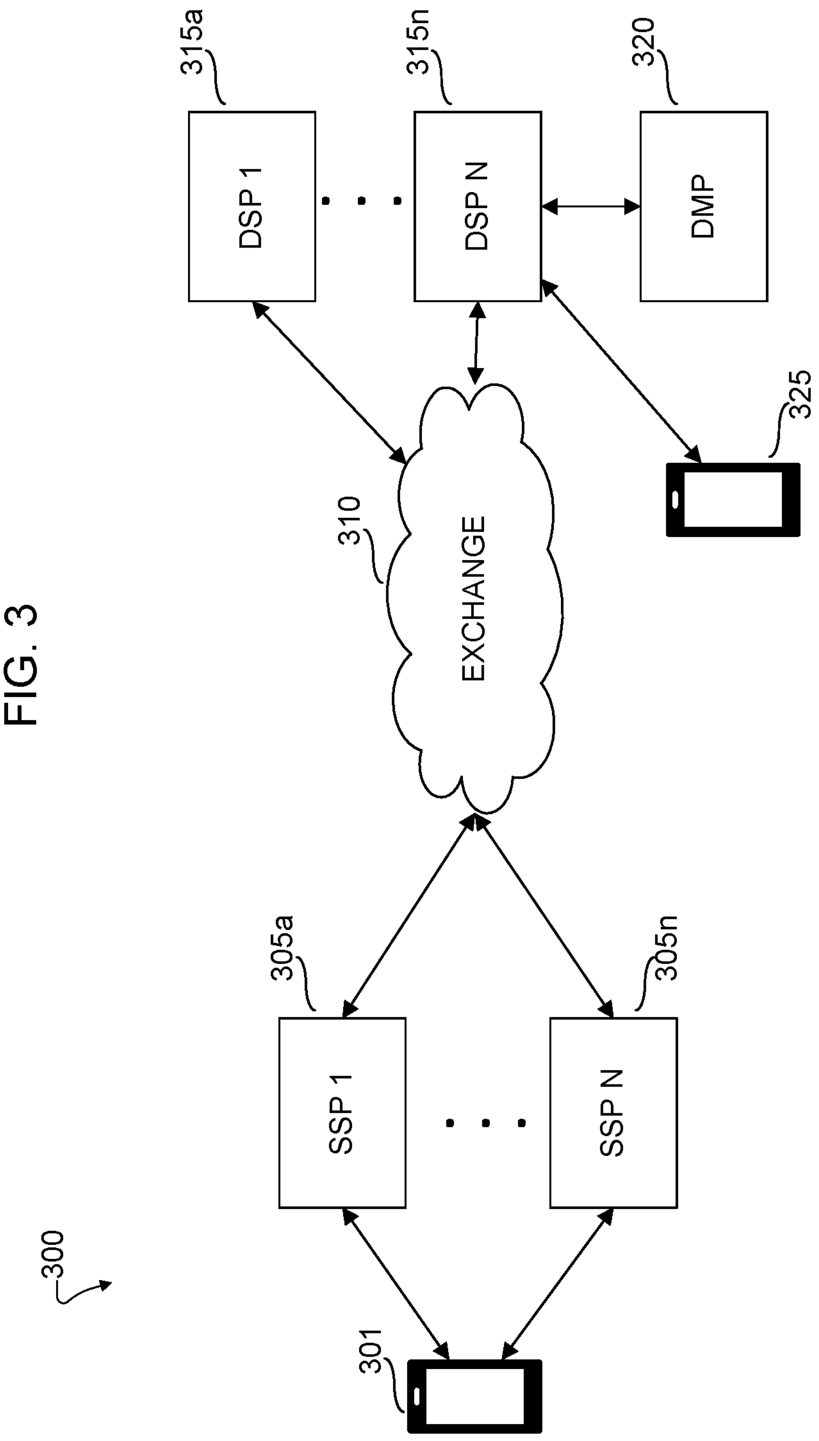
FIG. 3 illustrates an example of a network context according to various embodiments of this disclosure.

FIG. 3 illustrates a non-limiting example of a network context 300 in which systems and methods for bid optimization for real-time bidding according to embodiments of this disclosure may be implemented. While network context 300 is described with reference to a network context for real time bidding for digital advertisement impressions, the present disclosure is not limited thereto. Rather, the principles described with reference to FIG. 3 may be implemented in any number of contexts in which a networked apparatus (for example, 200) needs, in real-time, to generate an allocation of a finite set of first resources to an iterative series of contests for second resources, wherein incorrect allocations of resources equate to contest losses and an inefficient excess of allocation signaling. Put differently, having to transmit 10 bids to win one contest when five better-calculated bids would have won one contest is, from a system and network performance perspective, inefficient and slow. Accordingly, embodiments according to the present disclosure improve the performance of a processing platform as a tool for participating in real-time contests for contentious resources by reducing the number of bid submissions that need to be sent across a network to obtain an optimum resource allocation.

Referring to the example shown in FIG. 3, network context 300 comprises one or more electronic devices 301 (for example, instances of electronic device 100 in FIG. 1) executing at least one application (for example, a gaming application, or a web browser application) which hosts and provides a space for presenting ad impressions (for example, advertising content presented in a persistent header of a web page). Whereas in-app advertising space has historically been sold in advance, there has been a shift in the industry towards real-time bidding for advertisement impressions, wherein the interval between a visitor landing on a screen containing an advertisement space, and an advertiser's purchase of the advertisement space may be less than a second. That is, advertisers can (and do) bid in real-time for advertisement impressions presented at electronic device 301.

According to various embodiments, electronic device 301 is connected to one or more supply side platforms (SSP) **305*a* through 305*n*, which comprise computing platforms (for example, one or more instances of server 200 in FIG. 2 or cloud computing platforms equivalent thereto) which host advertisement content and respond to calls (for example, a call associated with a request for page content associated with a page visited by a web browser) for ad content. According to various embodiments, first SSP 305*a*** may be a first party ad server or a third-party ad server.

As shown in the illustrative example of FIG. 3, SSPs **305*a*-305*n* are communicatively connected to a real-time-bidding (RTB) ad exchange 310 (for example, a Sharethrough). According to various embodiments, ad exchange 310 comprises one or more instances of a computing platform (for example, server 200 in FIG. 2 or cloud computing platforms equivalent thereto) communicatively connected to SSPs 305***a* -305*n* and demand side platforms (DSPs) 315*a* -315*n*. Ad exchange 310 is configured to real-time auctions for advertisement impressions, wherein each DSP of DSPs 315*a*-315*n* programmatically generates and submits bid values for ad impressions on electronic device 301. In many instances, electronic device 301 belongs to a grouped cohort of electronic devices to which ad impressions will be served. As shown in FIG. 3, a DSP may be communicatively connected to a data management platform (DMP) 320, which in some embodiments, is a server at which historical data regarding past auctions may be stored and made available for one or more DSPs to use in generating bids. According to various embodiments, the performance of each DSP of DSPs 315*a*-315*n* depends significantly on the extent to which the DSP can generate optimized bid values. Where a DSP fails to consistently generate and submit bids at prices that: a.) maximize one or more metrics of interest (for example, total number of clicks on ad impressions, or return on advertisement spend); and b.) suffice to win auctions by thin margins, the performance of the DSP, both as a pricing tool, and a networked computing system is degraded. Put differently, where a DSP cannot reliably win auctions by thin margin, it needs to submit more bids over a network to ad exchange 310, resulting in unnecessary network traffic and system latency, as an unoptimized DSP is not capable of placing advertisements as quickly as a system which can reliably generate bids which win auctions by thin margins.

According to various embodiments, nth DSP 315*n* is communicatively connected to one or more processing platforms 325 (for example, instances of electronic device 100 in FIG. 1 or server 200 in FIG. 2) running an instance of DSP administrator application, through which one or more connected DSPs may be configured. In some embodiments, the DSP administrator application provides a UI through which DSP parameters can be specified, including, but not limited to, a key performance indicator (KPI) to be optimized, whether to enable consideration of user response uncertainty, whether or how to model risk tendency, one or more bidding strategies to be implemented, and whether to implement bid shading.

Reliance on unsupported assumptions about the confidence with which the probability that a user viewing an ad impression at an electronic device will respond in a particular way (for example, by clicking on the ad and/or making a purchase in response to viewing the advertisement) have historically been a source of error in how DSPs value ad impressions. This is due to a number of factors, including, without limitation, incompleteness and/or noise in the data set underlying the user response prediction. Absent compensation, the noise and errors in the user response data may be ported into the calculation of a bid price, resulting in bids based on erroneous valuations of ad impressions. As discussed elsewhere in this disclosure, errors in valuation can lead to incorrect bid values, which, in turn, can lead to either overpaying for ad impressions, and/or underbidding, which requires a DSP to submit more bids than might otherwise be necessary, which increases network traffic and latency.

Figure 4:
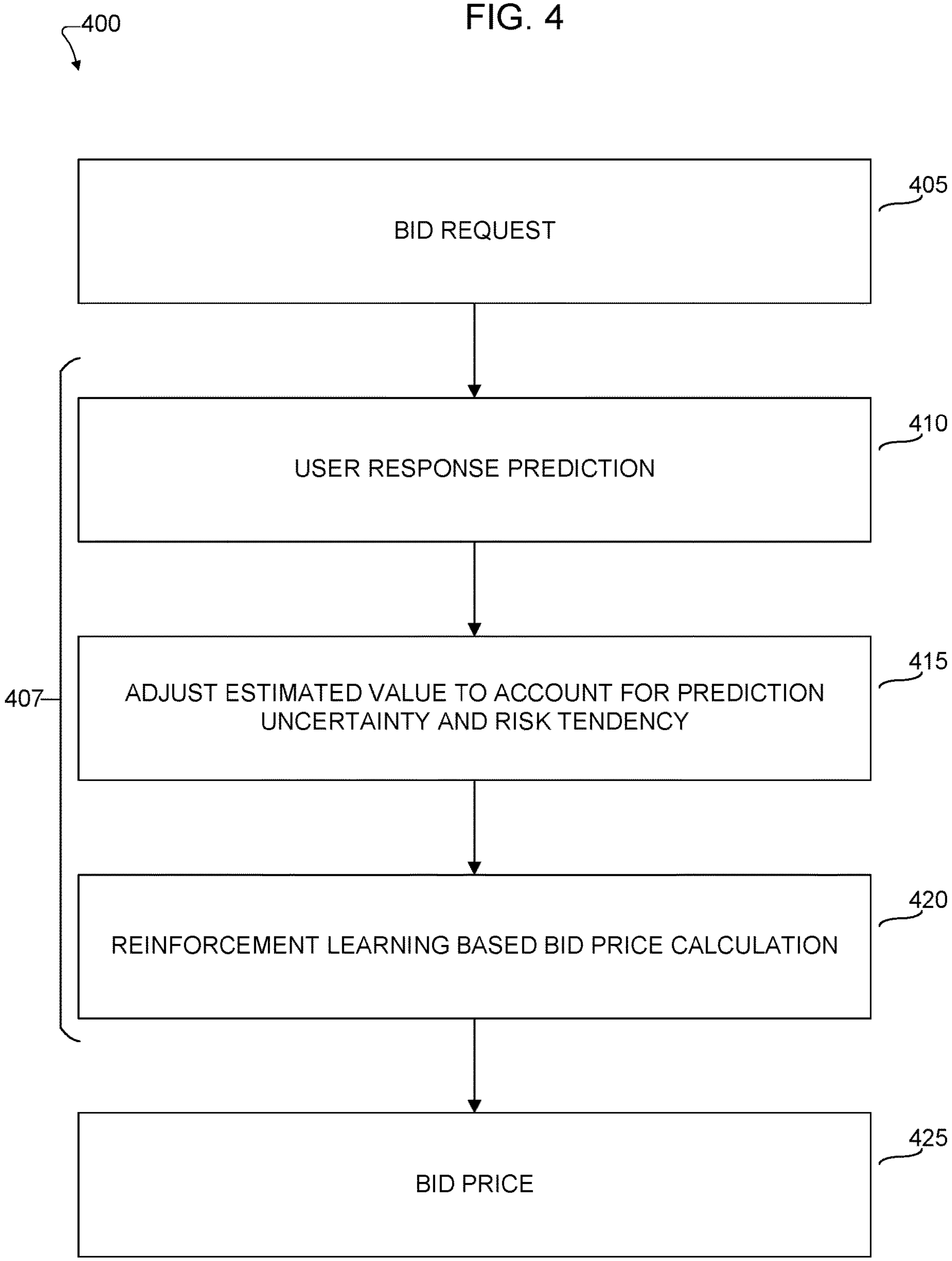
FIG. 4 illustrates operations of an example method for bid optimization according to various embodiments of this disclosure.

FIG. 4 illustrates operations of an example process 400 for performing bid optimization according to various embodiments of this disclosure. While FIG. 4 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The operations described with reference to FIG. 4 may be performed at any suitably configured processing platform connected to an ad exchange (for example, server 200 in FIG. 2 or DSP 315*n* in FIG. 3).

In contrast to certain historical approaches for bid price determination, which generate bids on the unsupported assumption that user response predictions generated by a DSP are perfectly accurate, certain embodiments according to this disclosure explicitly consider the uncertainty of user prediction results and factor this uncertainty into the bid price calculation. Accordingly, over the course of an ad campaign comprising a finite set of bids and a finite set of resources to bid with, certain embodiments according to this disclosure provide the benefits of optimizing KPI and diminished incidents of incorrectly valued underbids, which can create latency and increase bidding-related network traffic by the DSP.

Referring to the illustrative example of FIG. 4, at operation 405, the processing platform (for example, DSP 315*n*) receives, via a network, a bid request from an ad exchange. According to some embodiments, the bid request is for a single ad impression opportunity. The bid request may comprise information regarding the potential ad impression opportunity, including, without limitation a response deadline for the DSP to submit a bid, the name of the application through which the ad will be placed, information about the placement on the screen, an ad identifier of the user (for example, a Google Ad ID), information on the device at which the ad will be presented, and the IP address of the device at which the ad will be viewed. Receipt of the bid request triggers the start of a bid determination process 407.

According to various embodiments, bid determination process 407 comprises operation 410, wherein the DSP performs an initial prediction of one or more values of metrics (for example, click-through-rate or conversion rate) quantifying user reactions to the ad impressions at auction. Predicting a user response may comprise pulling, from a relevant store of historical data (for example, DMP 320 in FIG. 2) a sample set of data from prior equivalent or analogous advertisement campaigns and determining a representative value (for example, a mean click-through-rate) from the sample set.

Referring to the example shown in FIG. 4, at operation 415, the DSP adjusts the predicted value of the user response metrics to account for uncertainty in predicting the user response and to account for changes in a rational risk tendency over the course of an auction sequence. According to certain embodiments, at operation 410, the DSP accounts for the uncertainty in the predicted user response metric by calculating a standard deviation of the predicted value determined at operation 410.

In many instances, real-time auctions for ad impressions and other real-time contests for resources are structured such that DSPs have a finite number of opportunities to bid and capture the resources. Assuming that a DSP is configured to secure a specified number of ad impressions, the DSP's risk tendency, and by implication, should evolve over the course of the contest in response to the current state of the DSP, as expressed by factors comprising: the number of remaining bidding opportunities, the remaining resources available to the DSP for bidding, and the extent to which the DSP has won or secured value in prior auctions. Accordingly, at operation 415, a value expressing appropriate risk tendency given the current state of the DSP is determined. In some embodiments, the quantification of an appropriate risk tendency may be determined programmatically, based on predefined rules. In various embodiments, quantification of an appropriate risk tendency may be performed by providing current state data to a pre-trained machine learning (ML) model.

According to various embodiments, at operation 420, the DSP calculates a bid price based on a reinforcement learning based function of the uncertainty in the predicted user response and the risk tendency of the current state of the DSP within an auction cycle. At operation 425, the calculated bid price is submitted, via a network as a bid of the ad impressions offered in the bid request received at operation 405.

Figure 5:
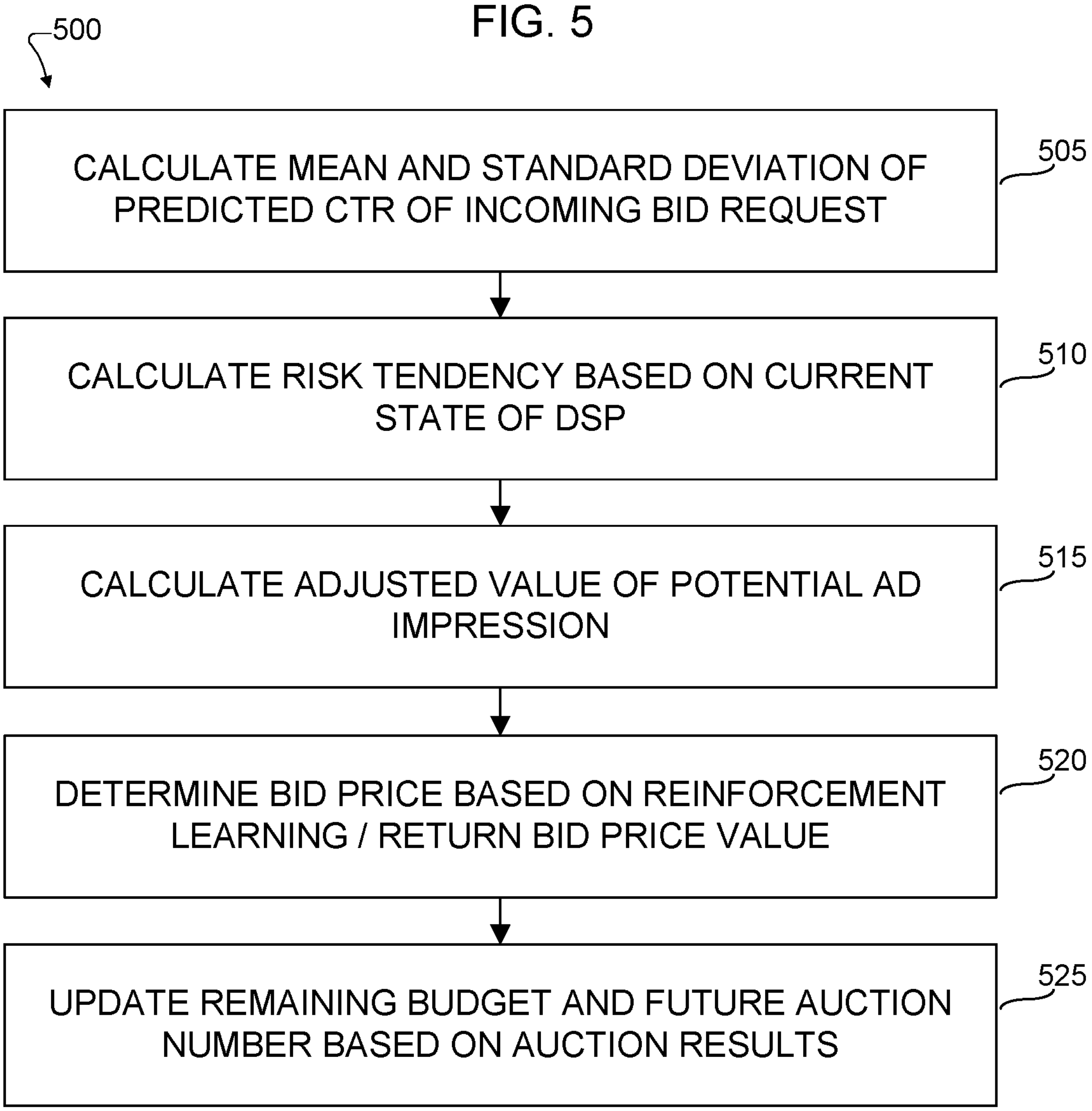
FIG. 5 illustrates operations of an example method for bid optimization according to various embodiments of this disclosure.

FIG. 5 illustrates a process 500 by a DSP (for example, DSP 315*n* in FIG. 3) for performing bid optimization according to various embodiments of this disclosure. While FIG. 5 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 500 depicted can be implemented by one or more processors in an image processing system, such as by one or more processors 140 of an electronic device 100.

Referring to the example shown in FIG. 5, at operation 505, upon receiving, via a network, a bid request from an ad exchange (for example, ad exchange 310 in FIG. 3), the DSP calculates, based on historical data from prior ad campaigns, a mean predicted click-through-rate (pCTR) for the ad impressions at auction. Further, in certain embodiments, the standard deviation of pCTR is calculated as an expression of the uncertainty of the predicted click through rate. Any prediction model which can generate a standard deviation value (for example, Bayesian logistic regression) may be used to determine a value of the standard deviation associated with mean pCTR. As used in this disclosure, the feature vector of the bid request may be denoted as x, while the mean of pCTR is denoted as $r_{mean}(x)$ and the standard deviation of pCTR may be expressed as $r_{std}(x)$.

According to various embodiments, DSP is configured to operate as a rational DSP, submitting bid values which are calculated to win auctions, while at the same time, maximizing one or more KPIs of an advertisement campaign as a whole. In some embodiments, the risk tendency of a rational DSP can be modeled as a function of the total number of future bidding auctions, expressed as $t \in \{0, \ldots, T\}$, where t is an index of a current auction, and T is the index of the last auction, and as a function of a remaining budget, expressed as $b \in \{0, \ldots, B\}$. In this example, the risk tendency, β can be expressed as a function β(t, b) of the current state of the DSP. The present disclosure contemplates a plurality of ways of formulating β(t, b), including, rules-based methods, and machine-learning based methods, such as described with reference to the example of FIG. 6.

In some embodiments, the risk tendency β can be determined based on a rule-based approach which sets the sign of the risk tendency, the monotonicity of the risk tendency and whether to apply an approximation for states in which a large fraction of the budget remains and there is a large number of remaining auctions. According to some embodiments, the sign of the risk tendency β may be specified by a first rule, set forth by Equation 1, below:

$$\beta(t, b)\begin{cases} \geq 0, & b \text{ is sufficient at current } t; \\ < 0, & \text{otherwise.} \end{cases} \tag{1}$$

As shown above, Equation 1 specifies that if the current value of b relative to t satisfies a sufficiency threshold (i.e., the budget is sufficient for the remaining number of auctions), the current value of risk tendency function β will be positive (i.e., the DSP will submit more risk-hungry bids), and similarly, if the current budget is low relative to the sufficiency threshold, the risk tendency will have a negative sign, indicating less risk tolerance. According to various embodiments, the sufficiency threshold may be a user-tunable parameter which can be set according to experimentation and/or subject matter expertise.

According to various embodiments the monotonicity of the risk function may be determined based on a second rule, specified by Equation 2, below:

$$\frac{\partial \beta(t, b)}{\partial t} < 0, \ \frac{\partial \beta(t, b)}{\partial b} > 0 \tag{2}$$

According to various embodiments, an approximation based on an existing risk function value may be applied where the current state and a previously determined state present an equivalently large number of remaining auctions and available budget. A rule for applying an approximation in such situations may be given by Equation 3, below:

$$\beta(t, b) \simeq \beta(t', b') \text{ if } \frac{b}{t} = \frac{b'}{t'}. \tag{3}$$

β may be given by Equation 4 below, which is an expression for β designed to conform to Equations 1-3, above:

$$\beta(t, b) = \tanh\left(\alpha \frac{U(t, b) - \hat{U}}{\hat{U}}\right) \tag{4}$$

Where α is a positive hyperparameter that controls the slope of risk tendency, Û is a budget richness threshold, which may be tuned from historical data, and function tanh (·) confines risk tendency within the range (−1, 1). According to certain embodiments, Û may be calculated based on Equation 5, reproduced below:

$$\sum_{\delta=0}^{U(t,b)} \delta m(\delta) = \frac{b}{t} \tag{5}$$

Where δ denotes the market price for the bid request and m(δ) is the market price distribution learned from historical data. Referring to the illustrative example of FIG. 5, at operation 515, the outputs of operation 505 are used to determine an adjusted estimated value θ of the ad impressions at auction, according to Equation 6, below:

$$\theta(t, b, x) = r_{mean}(x) + \beta(t, b) r_{std}(x) \tag{6}$$

Calculating θ as described with reference to Equation 6 above provides at least the following practical and technical benefits. First, it can be proven that, by using the linear equation such as Equation 6 to adjust the estimated value of the ad impression at auction, a bid embodying an optimum price under a value at risk (VaR) theory can be achieved. Put differently, embodiments according to this disclosure produce a bid value that more closely corresponds to what a truly rational price for an auctioned set of ad impressions should be. Further, the linear formulation described with reference to Equation 6 is computationally lightweight and can be quickly determined, even within the tight time constraints required by real-time-bidding for ad impressions or other real-time contest-based allocation schemes.

According to various embodiments, at operation 520 the adjusted potential value θ of the ad impressions at auction determined at operation 515 are used as part of a reinforcement learning based method of calculating an optimal bid value (a) in response to the received bid request. Given the value of θ(t, b, x), a reinforcement learning based method to calculate the optimal bid price for the bid request according to a function g(δ) may be used. The function g(δ), is, in certain embodiments, defined according to Equation 7, below:

$$g(\delta) \triangleq \theta(t, b, x) + V(t-1, b-\delta) - V(t-1, b) \tag{7}$$

Here δ denotes the market price (e.g., the second highest price in $2^{nd}$ price auctions), V(t−1, b−δ) is the cumulative reward from the state (t−1, b−δ) to the end of the episode. As used in this disclosure, the expression "episode" encompasses a set of bid requests as part of a campaign to win ad impressions at auction. V(t, b) can, in various embodiments, be approximated according to Equation 8, below:

$$V(t, b) \approx \max_{0 \le a \le b} \left\{ \sum_{\delta=0}^{a} m(\delta) r_{avg} + \sum_{\delta=0}^{a} m(\delta) V(t-1, b-\delta) + \sum_{\delta=a+1}^{\infty} m(\delta) V(t-1, b) \right\} \tag{8}$$

Where m(δ) is the market price distribution learned from historical data, $r_{avg}=\int_X p_x(x_{t-1}) r_{mean}(x_{t-1}) dx_{t-1}$ is the average ad impression value over the entire feature vector space X.

According to various embodiments, reinforcement learning may be performed by iteratively updating the cumulative reward V(t, b) given the average ad impression value $r_{avg}$ and market price distribution m(δ), where $$\sum_{\delta=0}^{\infty} m(\delta) = 1.$$

A bid price for submission can be determined based on the rules set forth as Equation 9, below:

$$a(t, b, x) = \begin{cases} b, & \text{if } g(b) \ge 0; \\ A, & \text{if } g(b) < 0. \end{cases} \tag{9}$$

Where A is an integer price satisfying the constraints 0≤A≤b, g(A)≥0 and g(A+1)<0.

Responsive to a bid price corresponding to a(t, b, $x$) having been generated and submitted to the ad exchange via a network, the DSP receives a result of the auction (i.e., an indication of whether the DSP had the winning bid or not). Responsive to receiving the auction result, at operation 525, the DSP updates the state of the DSP to reflect the remaining budget (i.e., subtracting the cost of a winning bid) and decrementing the number of future auctions.

Figure 6:
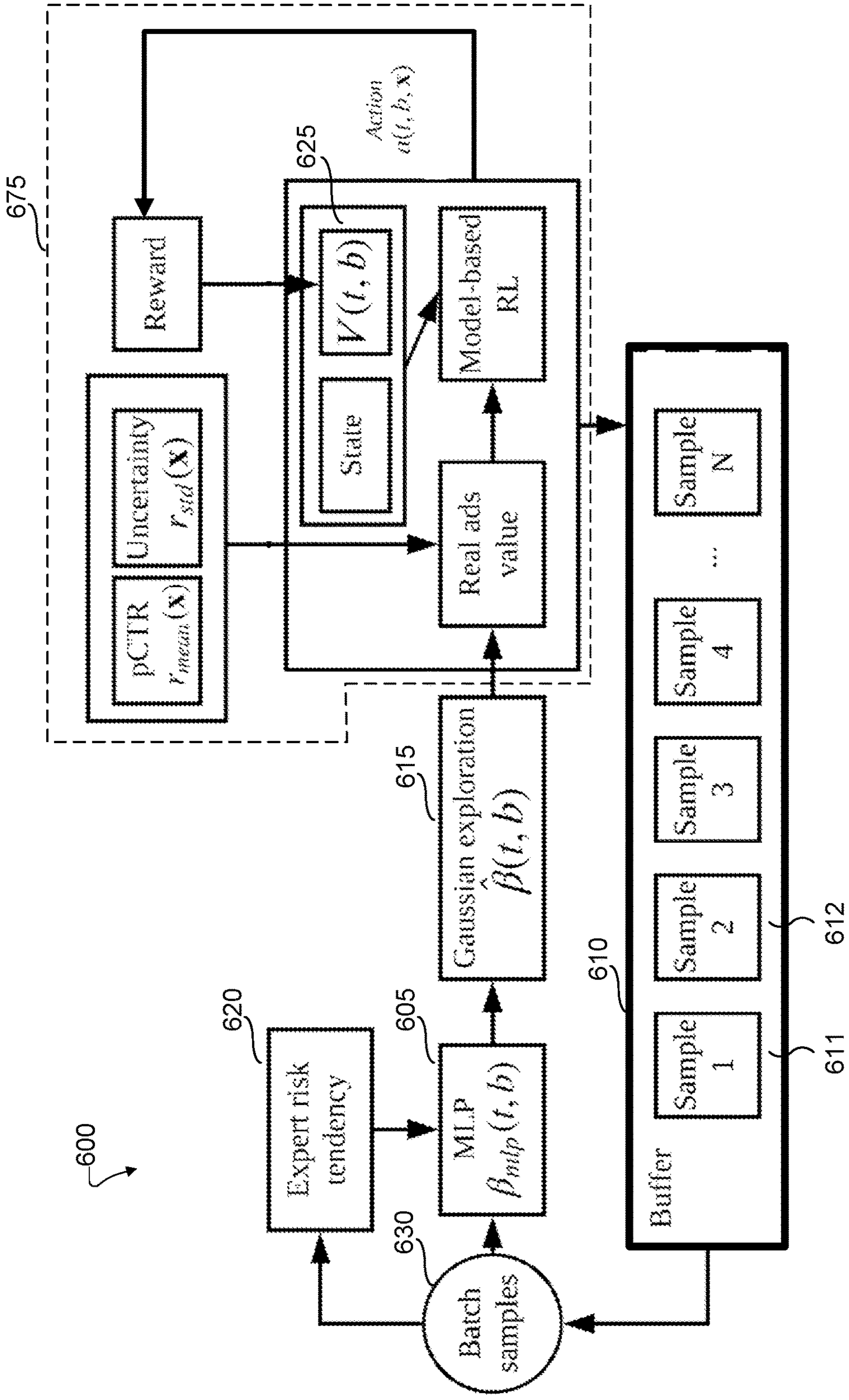
FIG. 6 illustrates an example of a framework for training a machine learning (ML) risk tendency model according to various embodiments of this disclosure.

FIG. 6 illustrates, in block diagram format, an example of a self-supervised risk tendency learning framework 600 according to various embodiments of this disclosure. According to certain embodiments, framework 600 trains a machine learning model (for example, a multi-layer perceptron ("MLP")) to implement a state-based risk tendency function $\beta_{mlp}$(t, b). As such, framework can be used in conjunction with, or as part of, other methods (for example, process 500 in FIG. 5) according to this disclosure.

Referring to the illustrative example of FIG. 6, framework 600 is shown as operating in conjunction with a second framework 675 for generating a response, also referred to as an "action" in response to a bid request (shown in the Figure as a(t, b, x)).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

According to various embodiments, framework 600 comprises a multi-level perceptron (MLP) 605 implementing a risk tendency function, $\beta_{mlp}$(t, b)=MLP(t, b; $W_{mlp}$), where $W_{mlp}$ is the trainable parameter matrix of the MLP. According to certain embodiments, MLP 605 is trained on a selected subset of historic sample data drawn from an iteratively updated experience buffer 610. To reduce the risk of overfitting and tune the balance between exploitation and exploitation, framework 600 further comprises a Gaussian exploration stage 615 and a batch sampler 630.

In certain embodiments, framework 600 operates by initially training MLP 605 based on previously obtained values 620 of β(t, b) for each auction event in a sequence of auction events (also referred to herein as an "episode"). According to certain embodiments, the previously obtained values 620 are provided to second framework 675 implementing a reinforcement-learning based method (for example, process 500 in FIG. 5) for determining an optimum bid price. For each auction within the episode, a reward value 625 V(t, b) for the placed bid is determined. At the end of the episode, the reward values 625 for each auction of the episode are combined (for example, as a sum of the reward values normalized for the number of auctions in the episode) to generate a value of an overall reward $V_{episode}$ for the episode. The values of β(t, b) obtained on this first iteration of calculating $V_{episode}$ based on an initial set of values mapping β to a state of the DSP, as expressed by the variables t and b, are added to an experience buffer 610 as a first sample 611, which is a memory configured to hold a predetermined, finite number (N) of training samples.

According to certain embodiments, subsequent iterations of determining $V_{episode}$ are performed, wherein Gaussian exploration stage 615 adds Gaussian noise to the historical values of β to determine the reward associated with slightly adjusted values of the risk tendency $\hat{\beta}$(t, b), where $\hat{\beta}$(t, b) may be specified by Equation 10, below:

$$\hat{\beta}(t, b) = \beta(t, b) + \epsilon \tag{10}$$

Where the Gaussian noise E may be given by Equation 11, below:

$$\epsilon \sim \mathcal{N}(0, \sigma^2) \quad (11)$$

According to some embodiments, the noise variance $\sigma^2$ is a user-tunable parameter, which can be adjusted to provide a trade-off between exploitation and exploration in reinforcement learning.

Referring to the non-limiting example of FIG. 6, the reward value $V_{episode}$ for the episode in which the values of $\hat{\beta}(t, b)$ were used to set the risk tendency for each auction is calculated. Subsequently, the values of $\hat{\beta}(t, b)$ for the episode are added to experience buffer 610 as a second sample 612. According to certain embodiments, the process of adding Gaussian noise to historical values of β and calculating $V_{episode}$ for each episode using noised risk tendency values is reiterated until experience buffer 610 is filled (i.e., it contains N samples). Once experience buffer 610 is filled, the process of calculating episode level rewards for noised mappings of risk tendency to DSP state continues, but with the added step of comparing subsequently calculated values of $V_{episode}$ against the lowest value of $V_{episode}$ among the samples in experience buffer 610. Where a set of values of $\hat{\beta}(t, b)$ yield a value of $V_{episode}$ that is greater than the smallest value of $V_{episode}$ among the samples in experience buffer 610, the sample with the lowest $V_{episode}$ is removed from experience buffer 610. In this way, experience buffer 610 comprises a set of "good" experiences represented by a quaternary set $\mathcal{B} = (t, b, \hat{\beta}(t, b), V_{episode})$ According to various embodiments, batch sampler 630 pulls a batch of samples from experience buffer 610, which may be used to train MLP 605 to generate a mapping of DSP states t and b which minimizes a loss function. Equation 12, below, provides a non-limiting example of a mean square loss function for training MLP 605.

$$\mathcal{L} = \sum_{(t,b,\hat{\beta}(t,b),\cdot) \in \mathcal{B}_{batch}} \left\| MLP(t, b; W_{mlp}) - \hat{\beta}(t, b) \right\|^2 \quad (12)$$

Table 1, below, provides pseudo-code describing the operations of framework 600.

TABLE 1

```
Input: The historical data sample with pCTR,
       uncertainty, market price, click labels, episode
       length T, and budget B
Output: Optimal bid price
Initialize the risk tendency, uniform replay policy;
Update cumulative reward V (t, b);
for each episode do
 | for each ad auction in current episode do
 | |  calculate bid price based on Eqs. (1) and (2),
 | |    execute auction and observe (t − 1, b) and
 | |    cumulative reward starting from initial state;
 | end
 | Calculate the cumulative reward of an episode;
 | if the cumulative reward V_episode is larger than
 |  lowest cumulative reward in Buffer then
 | | B ← (t, b, β̂(t, b), V_episode);
 | Uniformly sample a batch B_s from B ;
 | Train the MLP based on the batch sample ;
```

TABLE 1-continued

```
 | Update risk tendency β̂(t, b) and cumulative
 |  reward V (t, b);
end
```

Figure 7A:
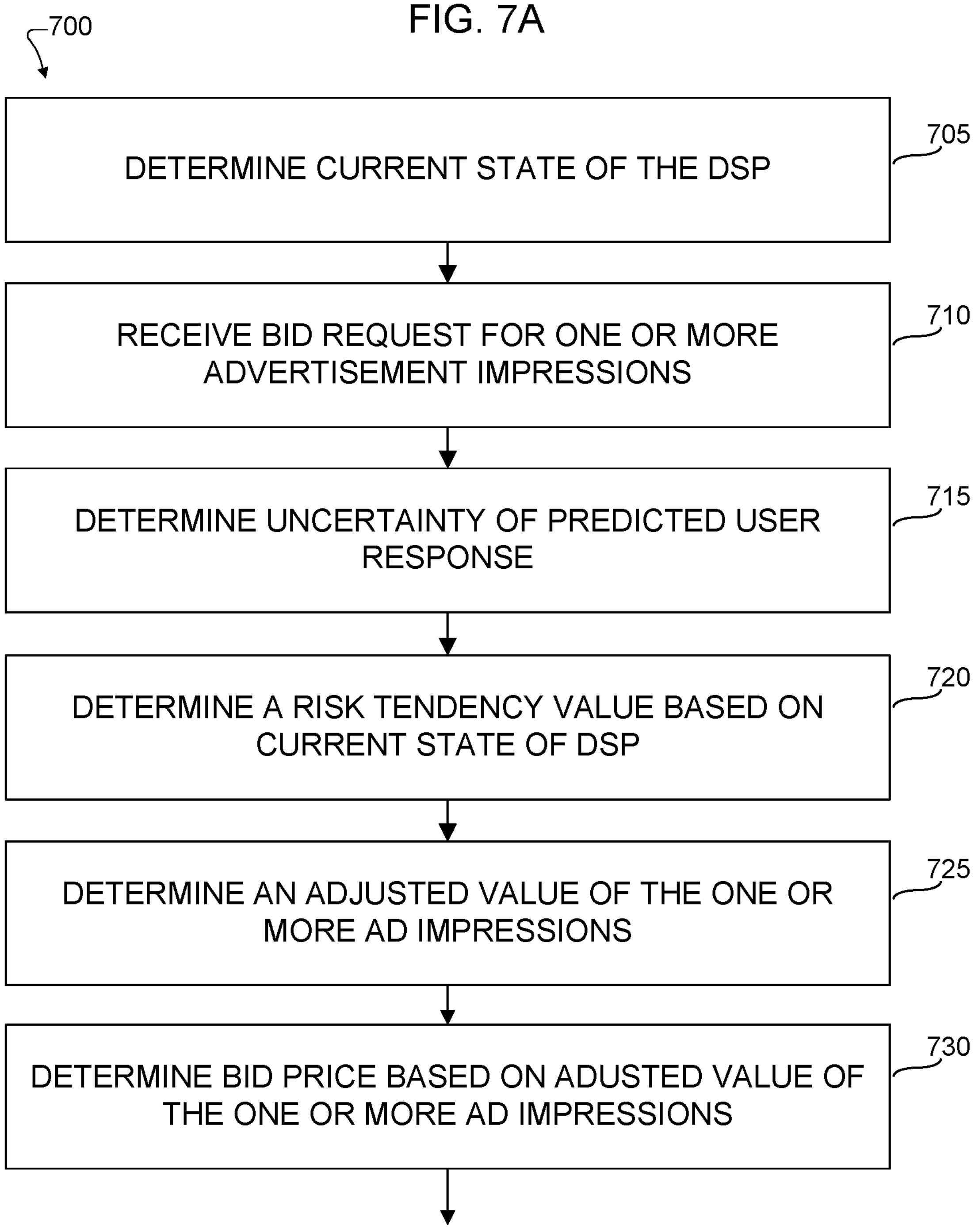
FIGS. 7A & 7B illustrate operations of an example method for performing bid optimization, according to various embodiments of this disclosure.
Figure 7B:
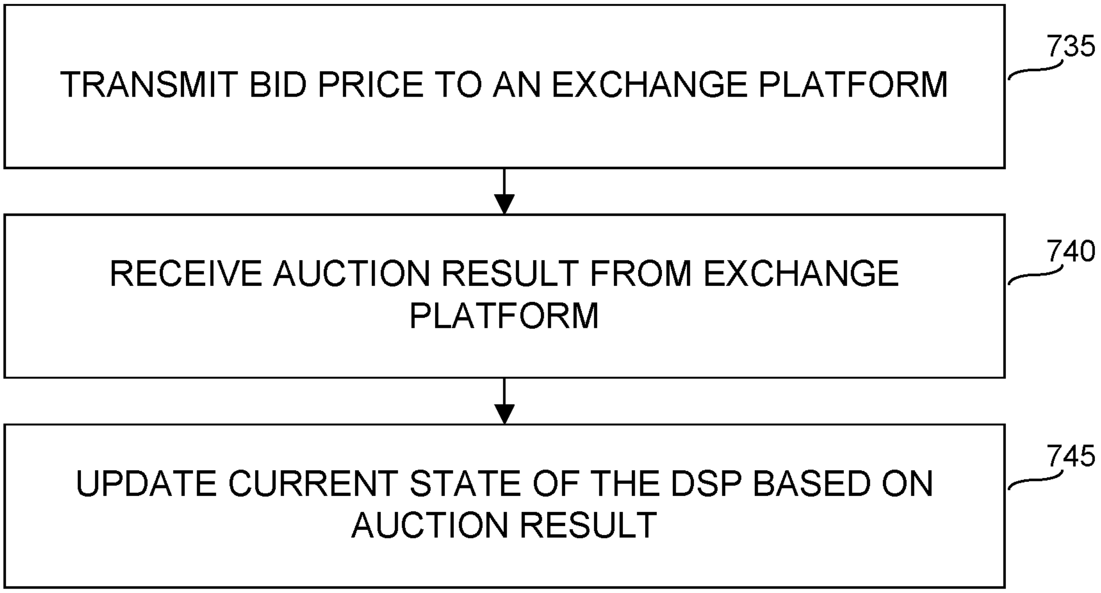

FIGS. 7A and 7B (collectively, "FIG. 7") illustrate operations of a process 700 for performing real-time bid optimization at a demand side platform (DSP) (for example, DSP 315*n* in FIG. 3), according to various embodiments of this disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in a suitably configured processing platform, such as by one or more processors 140 of an electronic device 100.

Referring to the example shown in FIG. 7, at operation 705, the DSP determines its current state, wherein the current state of the DSP comprises a value (for example, b in Equation 1 of this disclosure) expressing the remaining budget for submitting bids to an exchange platform (for example, ad exchange 310 in FIG. 3), and a value (for example, t in Equation 2 of this disclosure) expressing the number of future bidding auctions.

According to certain embodiments, at operation 710, the DSP receives, via a network, a bid request for one or more advertisement impressions. According to various embodiments, the received bid request may specify one or more parameters of the bid request, including, without limitation, a bid deadline. Additionally, in some embodiments, the bid request at operation 710 may further specify one or more parameters about the ad impressions at auction (for example, a region or type of device in which the ad impressions will be presented).

Referring to the illustrative example of FIG. 7, at operation 715, the DSP determines values of one or more metrics (for example, click-through-rate) representing a predicted user response to the ad impressions at auction, as well as values of one or more metrics (for example, a standard deviation) of the uncertainty of the predicted user response. According to certain embodiments, the predicted user response and uncertainty of the predicted user response may be determined according to the methods described with reference to operation 515 of FIG. 5.

According to certain embodiments, at operation 720, the DSP determines a risk tendency value based on the state information obtained at operation 705. In some embodiments, the state-based risk tendency value may be determined based on rule-based logic, such as described with reference to Equations 1-5 of this disclosure. In certain embodiments, the state-based risk tendency value may be determined automatically, based on a previously trained machine learning model, such as MLP 605 in FIG. 6.

Still referring to the illustrative example of FIG. 7, at operation 725, the DSP determines a value of the advertisement impressions at auction, wherein the adjusted value of ad impressions accounts for both the inherent uncertainty in the user response to the advertisement impressions, and the evolution of the DSP's rational risk tendency depending on the state of the DSP (i.e., the number of future opportunities to submit bids, and the remaining budget). In various embodiments, the determination of the adjusted value of the ad impressions may be performed based on a linear formulation, such as described with reference to operation 515 in FIG. 5. According to some embodiments, at operation 730, the DSP determines an optimum bid price based on the risk and uncertainty-adjusted value of the ad impressions at auction. In some embodiments, the bid price may be determined as described with reference to operation 530 in FIG. 5.

As shown in FIG. 7, at operation 735, the DSP transmits a bid containing the bid value determined at operation 730, via a network to an exchange platform. Depending on embodiments, the bid may be transmitted within a predetermined time before the bid deadline, to account for possible network latencies. Additionally, in some embodiments, operation 735 may be conditional, and to conserve resources, such as where the bid price falls below one or more threshold values (for example, when the remaining budget does not afford a larger bid) or where the bid price falls sufficiently short of a predicted market price for the ad impressions, operation 735 is omitted, and process 700 proceeds from operation 730 to operation 740.

At operation 740, the DSP receives an auction result from the exchange platform, advising whether the DSP won the auction or not, and at operation 745, the DSP updates the current state of the DSP based on the auction result. Where budget and bidding opportunities remain, process 700 may loop back to operation 705 for the next auction in the episode.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of operating a demand side platform (DSP) running within a processing platform performing automatic bidding on advertisement impression auctions with an auction sequence, the method comprising:

to enhance speed and efficiency in use of computational cycles for bid determination by the processing platform, for each auction within the auction sequence:

determining, by the DSP, a current state of the DSP stored within the processing platform, wherein the current state of the DSP is based on a remaining bid budget, a remaining number of bid opportunities for auctions within the auction sequence, and an extent to which the DSP has won prior auctions;

receiving, at the DSP from an ad exchange platform over a network to which the processing platform is connected, a bid request for one or more advertisement impressions offered in one auction within the auction sequence;

determining, in the DSP, an uncertainty of predicted user response metrics predicted by the DSP to quantify user reactions to the one or more advertisement impressions;

determining, in the DSP, a risk tendency value based on the current state of the DSP;

determining, in the DSP, an adjusted value of the one or more advertisement impressions based on the uncertainty and the risk tendency value;

determining, in the DSP, a bid price for each of the one or more advertisement impressions based on the adjusted value of the one or more advertisement impressions;

transmitting the bid price by the DSP over the network to the ad exchange platform to participate in the one auction within the auction sequence;

receiving, at the DSP from the ad exchange platform over the network, an auction result for the one auction within the auction sequence; and updating the current state of the DSP stored within the processing platform based on the auction result.

2. The method of claim 1, wherein the bid price is further determined based on a reinforcement learning trained model.

3. The method of claim 1, wherein determining the risk tendency value comprises:

determining a sign of the risk tendency value;

determining a monotonicity of the risk tendency value; and determining applicability of an early state approximation.

4. The method of claim 1, wherein determining the risk tendency value comprises:

training a multi-layer perceptron to learn a risk tendency function associating the risk tendency value with current values of remaining bid budget and remaining number of opportunities.

5. The method of claim 4, wherein training the multi-layer perceptron comprises adding Gaussian noise to the risk tendency function during training.

6. The method of claim 4, wherein training the multi-layer perceptron comprises populating and updating an experience buffer comprising a set of DSP state data associated with leading values of a reward function.

7. The method of claim 1, further comprising:

receiving by the DSP, from an external device, via a network, at least one of a configuration command enabling prediction of uncertainty compensation or a configuration command enabling one or more risk tendency compensation modes.

8. A demand side platform (DSP), the DSP comprising:

a processing platform within which the DSP is running, the processing platform configured to perform automatic bidding on advertisement impression auctions with an auction sequence;

a network interface to a network including the processing platform and an ad exchange platform; and a memory containing instructions that, when executed by the processing platform, enhance speed and efficiency in use of computational cycles for bid determination by the processing platform, wherein the instructions when executed cause the DSP, for each auction within the auction sequence, to:

determine, by the DSP, a current state of the DSP stored within the processing platform, wherein the current state of the DSP is based on a remaining bid budget, a remaining number of bid opportunities for auctions within the auction sequence, and an extent to which the DSP has won prior auctions, receive, at the DSP via the network interface from the ad exchange platform over the network, a bid request for one or more advertisement impressions offered in one auction within the auction sequence, determine, in the DSP, an uncertainty of predicted user response metrics predicted by the DSP to quantify user reactions to the one or more advertisement impressions, determine, in the DSP, a risk tendency value based on the current state of the DSP, determine, in the DSP, an adjusted value of the one or more advertisement impressions based on the uncertainty and the risk tendency value, determine, in the DSP, a bid price for each of the one or more advertisement impressions based on the adjusted value of the one or more advertisement impressions, transmit, via the network interface by the processing platform, the bid price to the ad exchange platform to participate in the one auction within the auction sequence, receive, via the network interface at the DSP from the ad exchange platform, an auction result for the one auction within the auction sequence, and update the current state of the DSP stored within the processing platform based on the auction result.

9. The DSP of claim 8, wherein the bid price is further determined based on a reinforcement learning trained model.

10. The DSP of claim 8, wherein determining the risk tendency value comprises:

determining a sign of the risk tendency value;

determining a monotonicity of the risk tendency value; and determining applicability of an early state approximation.

11. The DSP of claim 8, wherein determining the risk tendency value comprises:

training a multi-layer perceptron to learn a risk tendency function associating the risk tendency value with current values of remaining bid budget and remaining number of opportunities.

12. The DSP of claim 11, wherein training the multi-layer perceptron comprises adding Gaussian noise to the risk tendency function during training.

13. The DSP of claim 11, wherein training the multi-layer perceptron comprises populating and updating an experience buffer comprising a set of DSP state data associated with leading values of a reward function.

14. The DSP of claim 8, wherein the memory further contains instructions, which, when executed by the processing platform, cause the DSP to:

receive by the DSP, from an external device, via the network interface, at least one of a configuration command enabling prediction of uncertainty compensation or a configuration command enabling one or more risk tendency compensation modes.

15. A non-transitory, computer-readable medium containing instructions that, when executed by a processing platform within which a demand side platform (DSP) is running, cause the processing platform to perform automatic bidding on advertisement impression auctions with an auction sequence, the instructions when executed causing the processing platform to enhance speed and efficiency in use of computational cycles for bid determination by the processing platform, wherein the instructions when executed cause the DSP, for each auction within the auction sequence, to:

determine, by the DSP, a current state of the DSP stored within the processing platform, wherein the current state of the DSP is based on a remaining bid budget, a remaining number of bid opportunities for auctions within the auction sequence, and an extent to which the DSP has won prior auctions, receive, at the DSP via a network interface from an ad exchange platform, a bid request for one or more advertisement impressions offered in one auction within the auction sequence, determine, in the DSP, an uncertainty of predicted user response metrics predicted by the DSP to quantify user reactions to the one or more advertisement impressions, determine, in the DSP, a risk tendency value based on the current state of the DSP, determine, in the DSP, an adjusted value of the one or more advertisement impressions based on the uncertainty and the risk tendency value, determine, in the DSP, a bid price for each of the one or more advertisement impressions based on the adjusted value of the one or more advertisement impressions, transmit, via the network interface, the bid price to the ad exchange platform to participate in the one auction within the auction sequence, receive, at the DSP via the network interface, an auction result for the one auction within the auction sequence, and update the current state of the DSP stored within the processing platform based on the auction result.

16. The non-transitory, computer-readable medium of claim 15, wherein the bid price is further determined based on a reinforcement learning trained model.

17. The non-transitory, computer-readable medium of claim 15, wherein determining the risk tendency value comprises:

determining a sign of the risk tendency value;

determining a monotonicity of the risk tendency value; and determining applicability of an early state approximation.

18. The non-transitory, computer-readable medium of claim 15, wherein determining the risk tendency value comprises:

training a multi-layer perceptron to learn a risk tendency function associating the risk tendency value with current values of remaining bid budget and remaining number of opportunities.

19. The non-transitory, computer-readable medium of claim 18, wherein training the multi-layer perceptron comprises adding Gaussian noise to the risk tendency function during training.

20. The non-transitory, computer-readable medium of claim 18, wherein training the multi-layer perceptron comprises populating and updating an experience buffer comprising a set of DSP state data associated with leading values of a reward function.

* * * * *